April 13, 1948.
G. C. CLARK
2,439,451
FISHING TACKLE
Filed Feb. 15, 1946
3 Sheets-Sheet 1
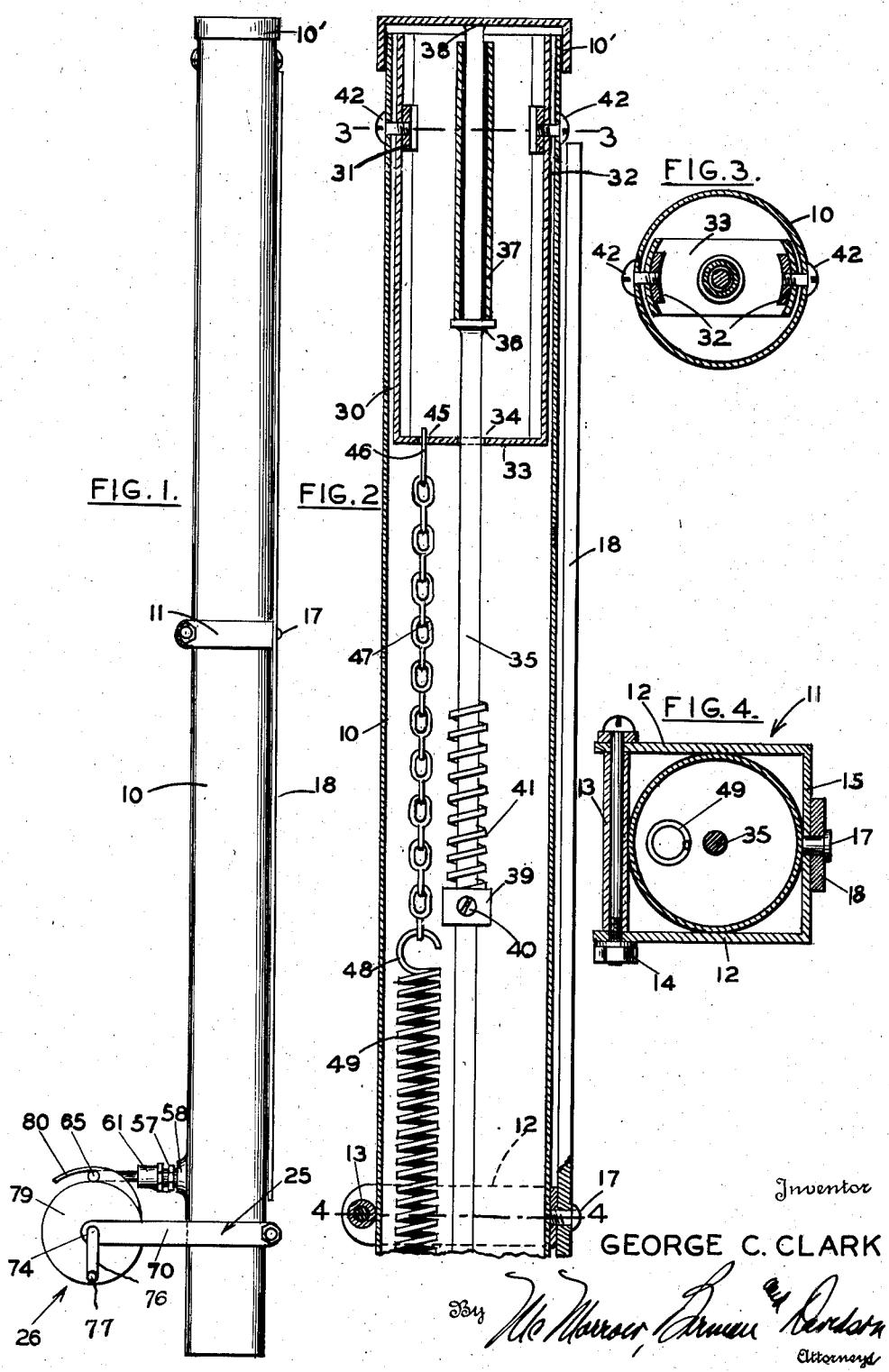
Inventor
GEORGE C. CLARK

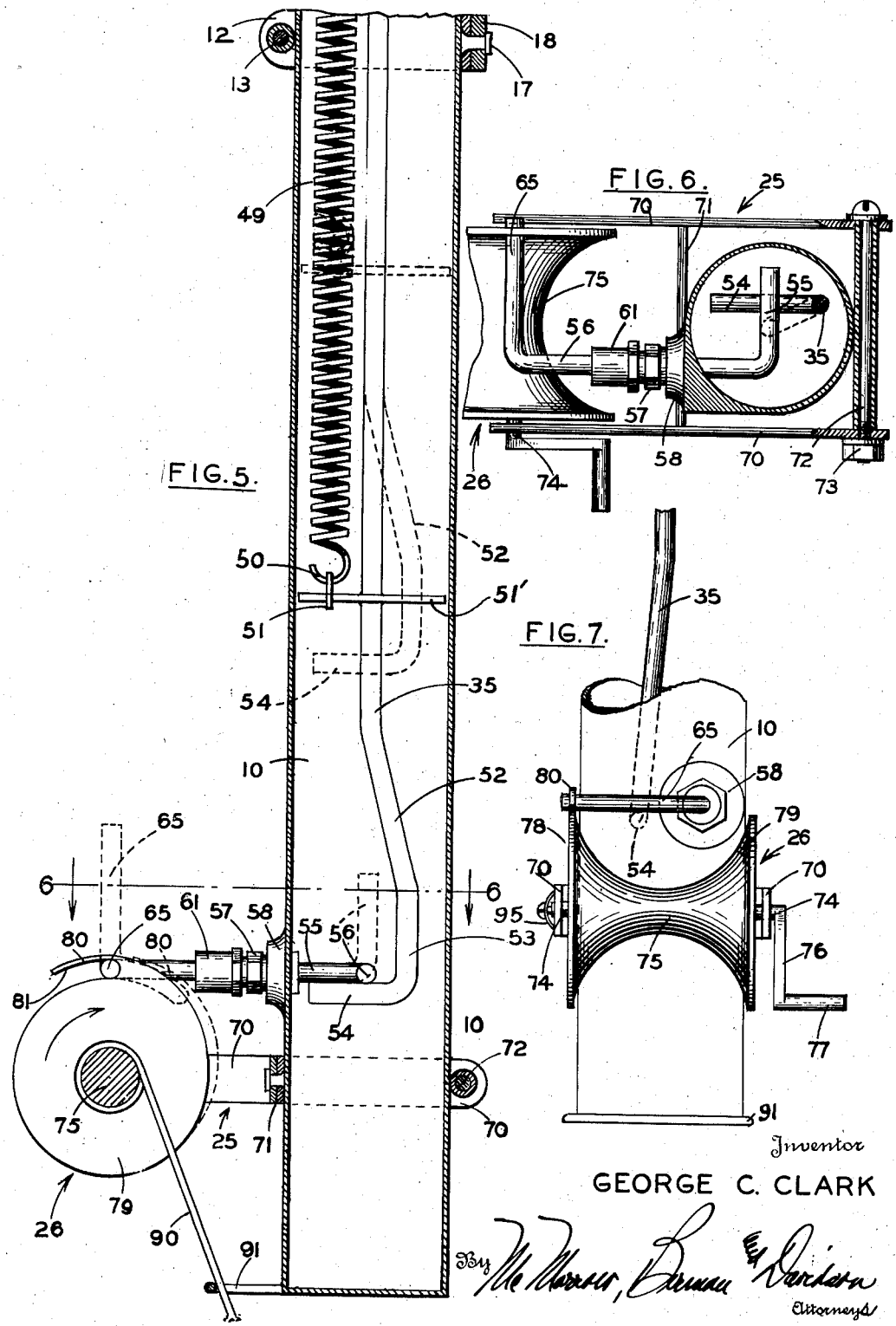

April 13, 1948.  G. C. CLARK  2,439,451
FISHING TACKLE
Filed Feb. 15, 1946   3 Sheets-Sheet 3

Inventor
GEORGE C. CLARK

Patented Apr. 13, 1948

2,439,451

UNITED STATES PATENT OFFICE 2,439,451

FISHING TACKLE

George C. Clark, Pontiac, Mich.

Application February 15, 1946, Serial No. 647,885

6 Claims. (Cl. 43—17)

This invention relates to fishing tackle, and more particularly to a device adapted to be utilized in ice fishing.

A primary object of this invention is the provision of an improved device adapted to be utilized in fishing through the ice in winter, provided with means whereby when a fish strikes the line, which is customarily left unattended in ice fishing, an indicator will be raised to attract the attention of the fisherman.

An additional object of the invention is the provision of an improved device of this character wherein the operating mechanism is maintained in fluid-tight relation, whereby locking of parts such as might be occasioned by the freezing of water thereon is obviated.

A still further object of the invention is the provision of such a device which is sturdy and durable in construction, reliable and efficient in operation, relatively small, compact and easy to handle, and inexpensive to manufacture and assemble.

Still other objects reside in the combinations and elements, arrangement of parts, and features of construction, all as will be more fully pointed out hereinafter and disclosed in the accompanying drawing wherein there is shown a preferred embodiment of this inventive concept.

In the drawings—

Figure 1 is a side elevational view of one form of the device embodying the instant inventive concept.

Figure 2 is an enlarged longitudinal sectional view of the upper half of the device disclosed in Figure 1.

Figure 3 is a sectional view taken substantially along the line 3—3 of Figure 2.

Figure 4 is a sectional view taken substantially along the line 4—4 of Figure 2.

Figure 5 is an enlarged longitudinal sectional view of the lower half of the device shown in Figure 1 and complementary to Figure 2.

Figure 6 is a fragmentary sectional view taken substantially along the line 6—6 of Figure 5 as viewed in the direction indicated by the arrows.

Figure 7 is a fragmentary end elevational view of certain details of the operating mechanism, as viewed from the left in Figure 5.

Similar reference characters refer to similar parts throughout the several views of the drawings.

Figure 8:
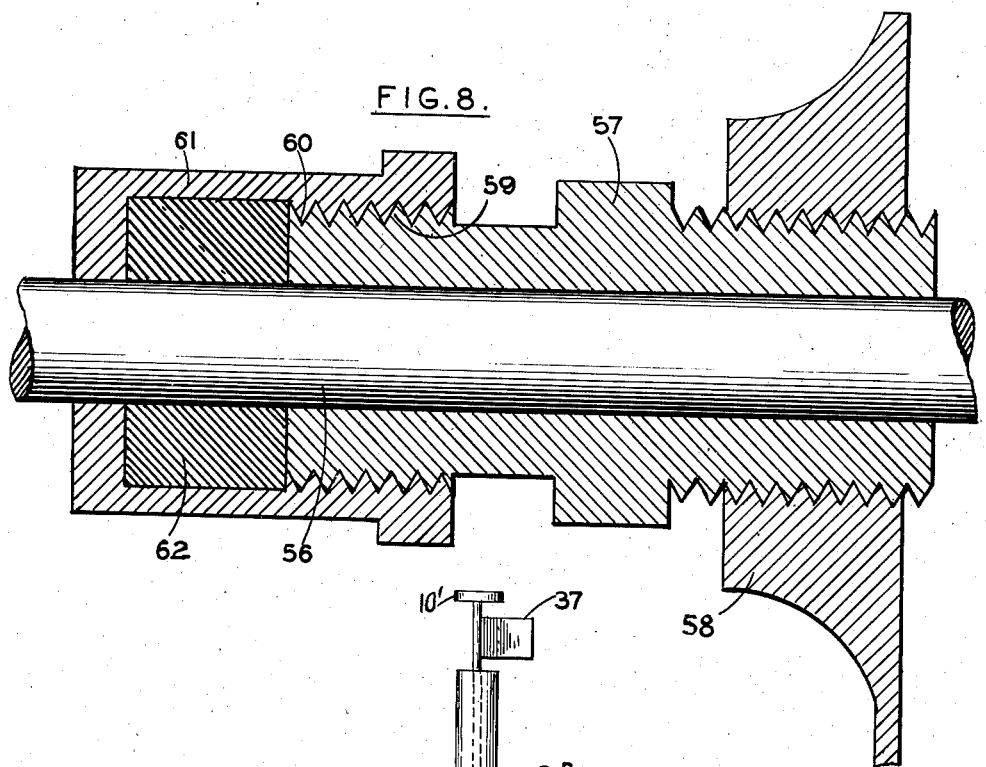
Figure 8 is an enlarged sectional view of a constructional detail.

Having reference now to the drawings, and more particularly to Figure 1 there is indicated at 10 a member sealed at its lower extremity, which may be of circular, rectangular or polygonal cross-section and provided at its upper extremity with a removable cap 10'. Positioned intermediately of the sleeve 10 is a bracket 11 comprising, as best shown in Figure 4, side pieces 12 secured together by a bolt 13 and held in position as by a nut 14. A cross-piece 15 connects the opposite extremities of the side pieces 12, and includes a projecting stud 17, upon which is pivotally mounted for rotation an elongated cross bar 18.

Figure 9:
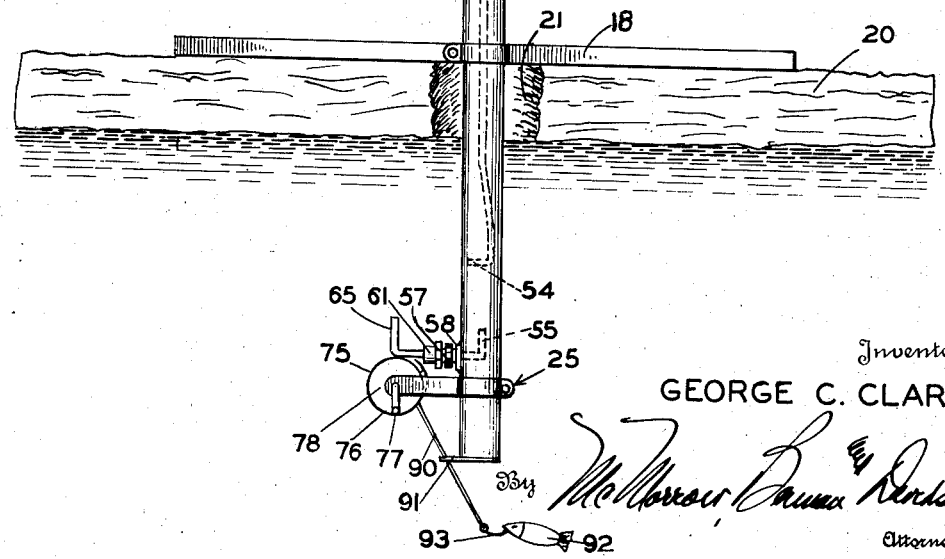
Figure 9 is an elevational view, partially schematic, certain concealed portions thereof being indicated by dotted lines, of the device in operation, showing the relation of the parts when the line is struck by a fish.

The cross bar 18 is adapted to be rotated about the stud 17, to a position as indicated in Figure 9, to support the sleeve 10 and its associated mechanism in position on the surface of the ice, the ice being indicated at 20 in Figure 9, and a suitable hole therein being indicated at 21. The lower portion of the sleeve 10 carries a bracket generally indicated at 25, which supports a line spool or reel, generally indicated at 26, both to be more fully described hereinafter.

Referring now to Figure 2, the upper portion of the sleeve 10 contains a guide bracket 30 comprising a ring-shaped portion 31 adapted to be positioned within the sleeve, and depending members 32 connected at their lower extremities by a transverse portion 33 provided with a centrally disposed aperture 34. Through the aperture 34 extends the upper portion of a trigger rod 35, flanged as at 36, and having secured thereto a signal flag 37 or other indicator. The upper portion of the rod 35 is connected to the cap 10' as indicated at 38. The trigger rod 35 is adapted to be moved upwardly abruptly, when a fish strikes, in a manner to be more fully described hereinafter, and is provided with a collar 39 secured to the rod as by a set screw 40, above which is positioned a bumper spring 41 adapted to take up the shock by its engagement with the transverse portion 33 of the bracket 30.

It may here be noted that the vertical or depending portion 32 of the bracket 30, and their associated ring 31 are adapted to be secured within the sleeve 10 by means of screws 42 extending exteriorly of the tube.

Secured through a suitable aperture 45 in the under side of the transverse member 33 is the extremity 46 of a chain 47, to the lower end of which is secured the end 48 of a trigger rod tension spring 49. As best shown in Figure 5, the lower end 50 of spring 49 is secured in a suitable aperture in a lug 51 in a circular guide plate 51' movably positioned within the sleeve 10.

With further reference to Figure 5 it will be seen that the lower end of the trigger rod 35 is offset as indicated at 52, and terminates in a depending portion 53 from which a portion 54 extends at right angles thereto transversely of the longitudinal bore of the sleeve 10.

The extremity 54 of the trigger rod 35 is adapted to be secured by a right angularly extending portion 55 of a trigger 56 which extends exteriorly of the sleeve 10 through a packing nut 57, which threadedly engages the female threads of an aperture in a boss 58 secured to the side of the tube. The packing nut 57, as best shown in Figure 8, is at its outer extremity provided with an enlarged threaded portion 59 adapted to engage the interior threads 60 of a packing gland 61, provided with interior fluid-tight packing 62. As best seen in Figures 6 and 7 the outer end of the trigger 56 is bent at right angles as indicated at 65 and is adapted to be secured in a manner to be more fully described hereinafter.

Referring back now to bracket 25, it will be seen that the same is comprised of side pieces 70, and a transverse piece 71 adapted to abut one side of the sleeve 10, the side pieces being adapted to be secured in position as by a bolt 72 secured by a nut 73. The side pieces 70 extend a substantial distance outwardly adjacent the boss 58, and in their extending extremities have journalled for rotation an axle 74, as best shown in Figures 6 and 7, on which axle is mounted a reel 75 of toroidal cross-section, adapted for the retention of a fishing line. One of the ends of the axle 74 is bent at right angles as at 76, and thence outwardly at 77 to provide a handle for rotation of the reel after the fish has been hooked. The reel 75 is provided with side plates 78 and 79 respectively, and the plate 79, as best shown in Figure 5, is provided with an extending portion 80 forming a recess 81 adapted to overlie and engage the right angled portion 65 of the trigger 56. It will thus be apparent that when the reel is in set position and the portion 65 of the trigger is in the recess 81, that the portion 55 of the trigger engaging the portion 54 of the trigger rod 35 holds the same in position, and correspondingly holds the trigger rod retracted and the signal flag 37 within the sleeve 10.

A line 90 is adapted to be wound on the reel 75, attached to a line guide 91 secured to the lower extremity of the sleeve 10.

A spring collar 95 is positioned on the extremity of shaft 74 to preclude back lash when a fish strikes.

Having reference now to Figure 9, it will be readily understood that when the device is positioned as shown, the cross-bar 17 being positioned transversely across the ice over an aperture therein, and the lower portion of the sleeve 10 being extended below the ice, that when a fish 92 strikes the hook 93 secured to the extremity of the line 90 that the reel 75 is rotated, and that such rotation causes corresponding movement of the projecting portion 80, as indicated in dotted lines in Figure 5, and that such rotation releases the member 65. The tension of the spring 49 then causes the portion 54 of the trigger rod 35 to rotate the portion 55 of the trigger 56, the portion 65 thereof being free for rotation, thus permitting the rod 35 to move upwardly to the dotted line position disclosed in Figure 5.

It will be seen that such upward movement occasions the lifting of the cover 10', the rod being moved outwardly to the limit permitted by the bumper spring 49 and its associated collar 39, and that the signal flag 37 is then exposed above the top of the rod, as generally indicated in Figure 9. Obviously, upon such indication the fisherman may retrieve the tackle from the hole in the ice, and by rotation of the hand crank 77 bring the fish in through the hole 21 in the ice.

From the foregoing it will now be seen that there is herein provided an improved fishing tackle, particularly adapted for fishing through ice, which accomplishes all the objects of this invention, and others, including many advantages of great practical utility and commercial importance.

As many embodiments may be made of this inventive concept, and as many modifications may be made in the inventive concept hereinbefore shown and described, it is to be understood that all matter herein is to be interpreted merely as illustrative and not in a limiting sense.

I claim:

1. In a fishing tackle for ice fishing, the combination of a fluid-tight sleeve, a trigger rod movable in said sleeve, a signal flag carried by said trigger rod, a trigger, a packing gland through which said trigger extends into said sleeve, and means actuated by a striking fish for releasing said trigger to expose said flag.

2. In a fishing tackle for ice fishing, the combination of a fluid-tight sleeve, a trigger rod movable in said sleeve, a signal flag carried by said trigger rod, a trigger, a packing gland through which said trigger extends into said sleeve, and means actuated by a striking fish for releasing said trigger to expose said flag, said last mentioned means including a reel having a latch thereon engageable with a portion of said trigger.

3. In a fishing tackle for ice fishing, the combination of a fluid-tight sleeve, a trigger rod movable in said sleeve, a signal flag carried by said trigger rod, a trigger, a packing gland through which said trigger extends into said sleeve, means actuated by a striking fish for releasing said trigger to expose said flag, said last mentioned means including a reel having a latch thereon engageable with a portion of said trigger, and spring means operable to move said trigger rod upon release of said trigger for exposing said flag.

4. In a fishing tackle for ice fishing, the combination of a fluid-tight sleeve, a trigger rod movable in said sleeve, a signal flag carried by said trigger rod, a trigger, a packing gland through which said trigger extends into said sleeve, means actuated by a striking fish for releasing said trigger to expose said flag, said last mentioned means including a reel having a latch thereon engageable with a portion of said trigger, spring means operable to move said trigger rod upon release of said trigger for exposing said flag, and guide means interiorly of said sleeve for said trigger rod.

5. In a fishing tackle for ice fishing, the combination of a fluid-tight sleeve, a trigger rod movable in said sleeve, a signal flag carried by said trigger rod, a trigger, a packing gland through which said trigger extends into said sleeve, means actuated by a striking fish for releasing said trigger to expose said flag, said last mentioned means including a reel having a latch thereon engageable with a portion of said trigger, spring means operable to move said trigger rod upon release of said trigger for exposing said flag, guide means interiorly of said sleeve for said trigger rod, and a cap normally closing the upper end of said sleeve secured to the upper end of said trigger rod.

6. In a fishing tackle for ice fishing, the combination of a fluid-tight sleeve, a trigger rod movable in said sleeve, a signal flag carried by said trigger rod, a trigger, a packing gland through which said trigger extends into said sleeve, means actuated by a striking fish for releasing said trigger to expose said flag, said last mentioned means including a reel having a latch thereon engageable with a portion of said trigger, spring means operable to move said trigger rod upon release of said trigger for exposing said flag, guide means interiorly of said sleeve for said trigger rod, a cap normally closing the upper end of said sleeve secured to the upper end of said trigger rod, and spring bumper means on said trigger rod adapted to abut said guide means when said trigger is released.

GEORGE C. CLARK.

REFERENCES CITED

The following references are of record in the file of this patent:

UNITED STATES PATENTS

| Number | Name | Date |
| --- | --- | --- |
| 253,456 | Whitcomb | Feb. 7, 1882 |
| 2,089,097 | Millett | Aug. 3, 1937 |